United States Patent
Lee

(10) Patent No.: US 10,061,471 B2
(45) Date of Patent: Aug. 28, 2018

(54) DISPLAY DEVICE AND METHOD OF CONTROLLING THEREFOR

(71) Applicant: LG ELECTRONICS INC., Seoul (KR)

(72) Inventor: Seungjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 380 days.

(21) Appl. No.: 14/602,648

(22) Filed: Jan. 22, 2015

(65) Prior Publication Data

US 2016/0188162 A1 Jun. 30, 2016

(30) Foreign Application Priority Data

Dec. 29, 2014 (KR) .......................... 10-2014-0192529

(51) Int. Cl.
| | | |
|---|---|---|
| *G06F 3/048* | (2013.01) | |
| *G06F 3/0481* | (2013.01) | |
| *G06F 3/01* | (2006.01) | |
| *G06F 3/041* | (2006.01) | |
| *G06F 3/0484* | (2013.01) | |
| *G06F 3/0485* | (2013.01) | |

(52) U.S. Cl.
CPC .......... *G06F 3/04817* (2013.01); *G06F 3/013* (2013.01); *G06F 3/041* (2013.01); *G06F 3/0484* (2013.01); *G06F 3/0485* (2013.01); *G06F 2203/04102* (2013.01); *G06F 2203/04806* (2013.01)

(58) Field of Classification Search
CPC ......... G06F 1/1652; G06F 2203/04803; G06F 3/013; G06F 3/0481
See application file for complete search history.

(56) References Cited

U.S. PATENT DOCUMENTS

| | | | |
|---|---|---|---|
| 6,879,943 B1 * | 4/2005 | Shigemori | ............ G06F 17/212 345/660 |
| 7,109,967 B2 | 9/2006 | Hioki et al. | |
| 7,443,380 B2 | 10/2008 | Nozawa | |
| 7,880,718 B2 | 2/2011 | Cradick et al. | |
| 8,587,539 B2 | 11/2013 | Tziortzis et al. | |
| 2004/0008191 A1 | 1/2004 | Poupyrev et al. | |
| 2007/0101286 A1 * | 5/2007 | Minami | .............. G06F 3/04817 715/779 |
| 2008/0303782 A1 | 12/2008 | Grant et al. | |
| 2009/0049410 A1 * | 2/2009 | Fagans | ................... G06Q 10/10 715/838 |
| 2009/0089660 A1 * | 4/2009 | Atkins | .................. G06F 9/4443 715/243 |

(Continued)

FOREIGN PATENT DOCUMENTS

WO WO 2014/030947 A1 2/2014

*Primary Examiner* — Ryan F Pitaro

(74) *Attorney, Agent, or Firm* — Birch, Stewart, Kolasch & Birch, LLP

(57) ABSTRACT

The present specification discloses a display device and a method of controlling the display device. The display device includes a flexible display unit configured to display at least one or more icons and a control unit. If an event occurs in a manner that a partial area of the flexible display unit is overlapped with each other, the control unit can set a symmetrical outer blank area for a predetermined area and consistently arrange a space between the at least one or more icons.

17 Claims, 10 Drawing Sheets

(a)

(b)

(56) References Cited

U.S. PATENT DOCUMENTS

| | | |
|---|---|---|
| 2009/0219247 A1 | 9/2009 | Watanabe et al. |
| 2010/0011291 A1 | 1/2010 | Nurmi |
| 2010/0117975 A1 | 5/2010 | Cho |
| 2010/0141605 A1 | 6/2010 | Kang et al. |
| 2011/0057873 A1 | 3/2011 | Geissler et al. |
| 2011/0138271 A1* | 6/2011 | Tobita .................. G06T 11/60 715/246 |
| 2012/0112994 A1 | 5/2012 | Vertegaal et al. |
| 2012/0169609 A1 | 7/2012 | Britton |
| 2013/0044240 A1 | 2/2013 | Leskela et al. |
| 2013/0127606 A1 | 5/2013 | Chang |
| 2013/0135182 A1 | 5/2013 | Jung et al. |
| 2013/0145311 A1 | 6/2013 | Joo |
| 2013/0201115 A1 | 8/2013 | Heubel |
| 2014/0002402 A1 | 1/2014 | Kang et al. |
| 2014/0035869 A1 | 2/2014 | Yun et al. |
| 2014/0055375 A1 | 2/2014 | Kim et al. |
| 2014/0062976 A1 | 3/2014 | Park et al. |
| 2014/0068473 A1 | 3/2014 | Jano et al. |
| 2014/0118317 A1 | 5/2014 | Song et al. |
| 2014/0139473 A1* | 5/2014 | Kang .................... G06F 3/041 345/173 |
| 2014/0176421 A1* | 6/2014 | Chen .................... G06F 1/1652 345/156 |
| 2014/0189551 A1* | 7/2014 | Kim ..................... G06F 3/04817 715/765 |
| 2014/0198129 A1* | 7/2014 | Liu ...................... G06F 3/04815 345/633 |
| 2014/0223343 A1* | 8/2014 | Lee ...................... G06F 3/0482 715/765 |
| 2014/0247232 A1* | 9/2014 | George-Svahn ........ G06F 3/02 345/173 |
| 2014/0380186 A1* | 12/2014 | Kim ..................... G09G 3/2092 715/746 |
| 2015/0186020 A1* | 7/2015 | Ishihara ................ G06F 1/1624 715/760 |
| 2015/0220119 A1* | 8/2015 | Seo ...................... G06F 3/041 345/173 |
| 2015/0268850 A1* | 9/2015 | Zhang .................. G06F 9/4443 715/763 |
| 2015/0370448 A1* | 12/2015 | Hisano .................. G06F 3/017 715/815 |
| 2016/0259514 A1* | 9/2016 | Sang .................... G06F 3/04817 |
| 2017/0010766 A1* | 1/2017 | Nakashima ........... G06F 3/0482 |

* cited by examiner (a)

(b)

(a)

(b)

(a)

(b)

121  (a)  122

(b)

(a)

(b)

(a)

(b)

DISPLAY DEVICE AND METHOD OF CONTROLLING THEREFOR

This application claims the benefit of the Korean Patent Application No. 10-2014-0192529, filed on Dec. 29, 2014, which is hereby incorporated by reference as if fully set forth herein.

BACKGROUND OF THE INVENTION

Field of the Invention

The present specification relates to a display device and a method of controlling therefor.

Discussion of the Related Art

Various display devices are developing in accordance with advancement of a technology. For instance, new display devices including a display device of a curved surface type, a transparent display device, a flexible display device and the like are developing.

A flexible display device includes a flexible display. Hence, a user may watch content by unfolding the display and may be able to carry the display device by folding the display. And, since the flexible display device is capable of being folded or unfolded to a suitable size, the flexible display device can be used even in a narrow space.

A recently developed display device includes a touch sensor installed in a display side and receives a command by a touch touched on the display side. A display of a flexible display device is flexible. Hence, unlike a general display device, it is difficult for a user to input a touch command on the display of the flexible display device. In order for a user to use the flexible display device while carrying the flexible display device, the user may use the flexible display device in a manner of folding the flexible display device in a certain size. The user may use content positioned at a using area of a certain size when the flexible display device is folded.

Yet, when the flexible display device is folded, a part of folders or icons positioned at a folded area can be displayed on the using area only. And, although all of the folders or the icons are displayed on the using area, the folders or the icons can be positioned at near an outer line of the using area. Since a folder or an icon positioned in the vicinity of the outer line is asymmetrically arranged, it is inconvenience for a user to see the folder or the icon. And, since the user does not have room for the folder or the icon positioned in the vicinity of the outer line, it is uncomfortable for the user to input a touch command.

Hence, when the flexible display device is folded, it is necessary to have optimized content arrangement and space arrangement based on the using area.

SUMMARY OF THE INVENTION

Accordingly, the present specification is directed to an apparatus and method thereof that substantially obviate one or more problems due to limitations and disadvantages of the related art. An object of the present specification is to provide a display device capable of rearranging content and space for a using area of a flexible display device which is folded in a certain size and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a flexible display unit configured to display at least one or more icons and a control unit. If an event occurs in a manner that a partial area of the flexible display unit is overlapped with each other, the control unit can set a symmetrical outer blank area for a predetermined area and consistently arrange a space between the at least one or more icons.

And, the overlapped event corresponds to a folding event and the control unit can arrange the at least one or more icons in proportion to a size of a folded area of the flexible display unit.

And, the control unit calculates area of the folded area and area of the at least one or more icons and can calculate the number of icons to be arranged to the folded area based on the calculated area of the folded area and the calculated area of the at least one or more icons.

And, the control unit can arrange the at least one or more icons in a manner of adjusting a size of the at least one or more icons.

And, the control unit can arrange the at least one or more icons in a manner of adjusting the number of the at least one or more icons.

And, if the number of icons arranged to the folded area and an arrangement form are detected and a flipping command is inputted, the control unit can display a next page based on the number of icons arranged to the folded area and the arrangement form.

Meanwhile, the display device further includes a sensor unit capable of tracking a gaze of a user and the control unit can control the display unit to display at least one or more icons positioned at an area at which the gaze of the user detected by the sensor unit is located in a manner of enlarging the at least one or more icons.

And, if area of the folded area corresponds to a predetermined size, the control unit can control the display unit to display a predetermined screen on the folded area.

Meanwhile, the predetermined screen may correspond to at least one selected from the group consisting of a home screen, a bookmark screen and a user configuration screen.

And, the overlapped event corresponds to a rolling event and the control unit can arrange the at least one or more icons based on an area except an area blocked by a different area among areas of the same flat of the flexible display unit.

Meanwhile, the display device can further include a sensor unit capable of tracking a gaze of a user and the control unit can calculate area of an area of the flexible display unit where the gaze of the user detected by the sensor unit is within a predetermined angle range and area of the at least one or more icons and calculate the number of icons to be arranged to the area based on the calculated area of the area and the calculated area of the at least one or more icons.

And, the control unit can control the display unit to display at least one or more icons positioned at an area at which the gaze of the user detected by the sensor unit is located in a manner of enlarging the at least one or more icons.

And, if the flexible display unit is unfolded, the control unit calculates area of the unfolded flexible display unit and area of the at least one or more icons and can consistently arrange a space between the at least one or more icons based on the calculated area of the unfolded flexible display unit and the calculated area of the at least one or more icons.

And, the control unit can arrange the at least one or more icons in a manner of adjusting a size of the at least one or more icons.

And, the control unit can set a symmetrical outer blank area of the flexible display unit.

To further achieve these objects and other advantages and in accordance with the purpose of the invention, as embodied and broadly described herein, according to one embodiment, a method of controlling a display device, which includes a flexible display unit displaying at least one or more icons, includes the steps of occurring an event in a manner that a partial area of the flexible display unit is overlapped with each other and setting a symmetrical outer blank area for a predetermined area and consistently arranging a space between the at least one or more icons.

And, the overlapped event corresponds to a folding event and the arranging step can arrange the at least one or more icons in proportion to a size of a folded area of the flexible display unit.

And, if area of the folded area corresponds to a predetermined size, the arranging step can control the display unit to display a predetermined screen on the folded area.

And, the overlapped event corresponds to a rolling event and the arranging step can arrange the at least one or more icons based on an area except an area blocked by a different area among areas of the same flat of the flexible display unit.

Meanwhile, the method of controlling the display device can further include the steps of unfolding the flexible display unit and calculating area of the unfolded flexible display unit and area of the at least one or more icons and consistently arranging a space between the at least one or more icons based on the calculated area of the unfolded flexible display unit and the calculated area of the at least one or more icons.

According to the aforementioned various embodiments, a display device and a method of controlling therefor can optimize content arrangement and space arrangement based on a using area folded in a certain size.

And, if a flexible display is folded in a specific size, a display device and a method of controlling therefor can directly switch a screen to such a specific screen as a home screen.

And, a display device and a method of controlling therefor can arrange content and a space based on a gaze of a user.

And, a display device and a method of controlling therefor can switch a screen based on arrangement of an optimized using area.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
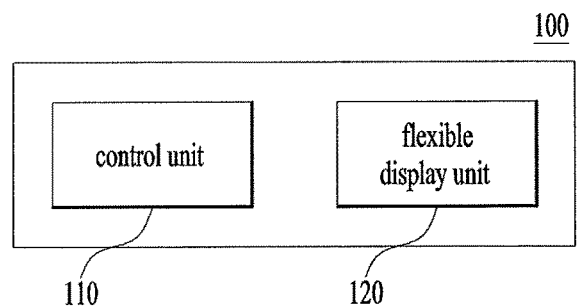
FIG. 1 is a block diagram for a display device according to one embodiment.

In the following description, preferred embodiments capable of concretely implementing the aforementioned object are explained with reference to attached drawings. In this case, composition and effect of the present specification shown in the drawings and explained by the preferred embodiments are explained as at least one embodiment. A technical idea of the present specification, a core composition and effect may be non-limited by the embodiment.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

FIG. 1 is a block diagram for a display device according to one embodiment.

Referring to FIG. 1, a display device 100 can include a control unit 110 and a flexible display unit 120.

The control unit 110 can configure an outer blank area symmetrical to a predetermined area when an event occurs in a manner that a partial area of the flexible display unit is overlapped with each other. And, the control unit 110 can consistently array a space of at least one or more icons. For instance, the event that a partial area is overlapped with each other may correspond to a folding event or a rolling event.

The folding event may indicate an event that a flexible display unit 120 is divided into two areas by folding the flexible display unit more than 90 degrees. In other word, the folding event may indicate an event generating a plurality of surfaces by bending the flexible display unit 120. In particular, the folding event may indicate an event conceptually dividing the flexible display unit 120 into a plurality of areas although the flexible display unit is not physically divided. As an embodiment, if the flexible display unit 120 is folded once, the flexible display unit can be divided into two areas.

The rolling event may indicate an event forming a shape similar to a cylinder form by rolling the flexible display unit 120. In other word, the rolling event may indicate an event making the flexible display unit 120 to be a circular form or a spiral form without making an edge on the flexible display unit 120.

As an embodiment, the display device 100 can include a sensor (not depicted). The sensor can detect folding or bending of the flexible display unit 120. Or, the sensor can detect that a partial area of the flexible display unit 120 is blocked by a different area. If the flexible display unit 120 is folded or rolled, the partial area of the flexible display unit 120 can be arranged at a rear side of the different area. Hence, the partial area of the flexible display unit 120 can be blocked by the different area and the sensor can detect an area blocked by the different area. Or, the sensor can detect change of a direction of the partial area. When a whole area of the flexible display unit 120 is heading to a specific direction, a partial area of the flexible display unit 120 can be folded or rolled. A direction of the folded or rolled partial area of the flexible display unit 120 can be switched to a different direction from the aforementioned specific direction. Hence, the sensor can detect that the direction of the partial area of the flexible display unit 120 is switched.

The predetermined area may correspond to a using area. The using area may correspond to an area intended to be used by a user in the flexible display unit 120 in which an event occurs in a manner that a partial area is overlapped with each other. For instance, an area maintaining a direction identical to an initial direction may correspond to the using area. Or, an area heading to a direction in which a gaze of a user is detected may correspond to the using area. Or, an area heading to a direction in which existence of a user is detected may correspond to the using area. Or, an area heading to a direction in which the greatest amount of light is detected may correspond to the using area.

The control unit 110 determines content to be displayed on the using area and can calculate a size of the using area. As an embodiment, the control unit 110 can configure an outer blank area in consideration of a size of content, the number of content and a size of the using area. When the control unit 110 configures the outer blank area, the control unit can configure an area of the outer blank area and a symmetrical outer blank area. The control unit 110 can arrange contents based on the configured outer blank area, a size of the contents, the number of the contents and the like. The control unit 110 can consistently arrange a space between the contents. For instance, the contents may include an icon, a folder, a thumbnail and the like.

The flexible display unit 120 can display contents. The flexible display unit 120 can be rolled or fold. And, the flexible display unit 120 may include a touch sensor. Hence, the flexible display unit 120 can receive a touch input from a user. The touch input is recognized by the control unit 110 and the control unit 100 can perform a command corresponding to the touch input.

The present specification explains a process for a display device 100 to arrange an outer blank area and contents based on a using area. Yet, the display device 100 can arrange the outer blank area and the contents based on not only the using area but also an area except the using area via an identical process.

Figure 2:
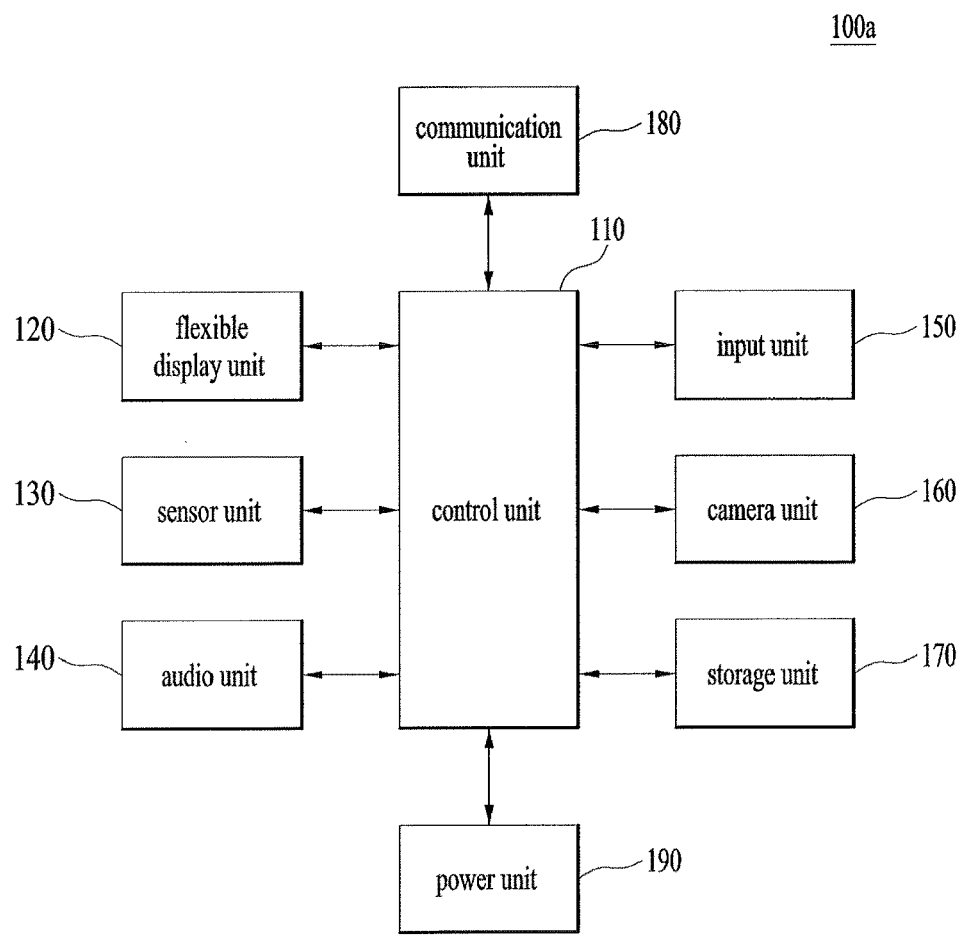
FIG. 2 is a block diagram for a display device according to a different embodiment.

FIG. 2 is a block diagram for a display device according to a different embodiment.

Referring to FIG. 2, a display device 100a can include a control unit 110, a flexible display unit 120, a sensor unit 130, an audio unit 140, an input unit 150, a camera unit 160, a storage unit 170, a communication unit 180 and a power unit 190.

The control unit 110 can execute contents stored in the storage unit 170, contents received via data communication or the like. And, the control unit 110 executes various applications and can process internal data of the display device 100a. And, the control unit 110 controls each of the components of the aforementioned display device 100a and may be able to control data transmission and reception between the components. The control unit 110 can include a processor, an ASIC (application-specific integrated circuit), a different chipset, a logical circuit, a register, a communication modem, a data processing device and the like known to a related technical field to execute various control logics to be described in detail in the following description. And, when the aforementioned control logic is implemented by software, the control unit 110 can be implemented by a set of program modules. In this case, the program modules are stored in the storage unit 170 and can be executed by the processor.

If an event occurs in a manner that a partial area of a flexible display 120 is overlapped with each other, the control unit 110 can configure an outer blank area symmetrical to a predetermined area. And, the control unit 110 can consistently arrange a space between contents. If a folding event occurs, the control unit 110 can arrange the contents in proportion to a size of a folded area of the flexible display unit 120. And, if a rolling event occurs, the control unit 110 can arrange the contents based on an area except an area blocked by a different area among areas of the same flat of the flexible display unit 120.

The flexible display unit 120 can output an image on a display screen. The flexible display unit 120 can output the image based on contents executed by the control unit 110 or a control command.

The sensor unit 130 detects surrounding environment of the display device 100a using at least one or more sensors installed in the display device 100a and can deliver the detected surrounding environment to the control unit 110. And, the sensor unit 130 detects a user input and can deliver the detected user input to the control unit 110. In this case, the sensor unit 130 can include at least one or more sensing means. Examples of the various sensing means may include a gravity sensor, a terrestrial magnetism sensor, a motion sensor, a gyro sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a fingerprint sensor and the like. The sensor unit 130 is a common name of the aforementioned various sensing means. The sensor unit 130 senses various inputs of a user and a user environment and can deliver the sensed result to the control unit 110 to enable the control unit 110 to perform an operation in accordance with the sensed result. Each of the aforementioned sensing means can be included in the display device 100a as a separate element or can be included in the display device in a manner of being integrated into at least one or more elements.

According to one embodiment of the present specification, the display device 100a can be equipped with the sensor unit 130 on the flexible display unit 120. Hence, the display device 100a can detect various user inputs performed on the flexible display unit 120 via the sensor unit 130. For instance, if the sensor unit 130 includes a touch sensor, the display device 100a can receive various touch inputs of a user performed on the flexible display unit 120. And, if the sensor unit 130 includes a fingerprint sensor, the display device 100*a* can collect fingerprint information of a user from a user input performed on the flexible display unit 120. As mentioned in the foregoing description, the display device 100*a* can be equipped with a screen sensor forming a layer structure formed by the display unit 120 and the sensor unit 130 in the present specification.

The sensor unit 130 can detect an event that a partial area of the flexible display unit 120 is overlapped with each other. And, the sensor unit 130 can detect a gaze of a user.

The audio unit 140 can include an audio output means such as a speaker and the like and an audio input means such as a microphone and the like. The audio output means can output an audio signal of content executed in a display device 100*a*. Content can be provided by the storage unit 170 or can be provided by an external terminal device via the communication unit 180. The audio input means can include at least one of an air conduction speaker and a bone conduction speaker. The air conduction speaker may correspond to an earphone or the like. The air conduction speaker vibrates air according to an audio signal and generates a sound wave. In particular, vibration of sound conducted by air is delivered to eardrum situating at the inside of an ear and vibration of the eardrum is delivered to a snail of a screw shape via three bones positioned at the inside of the eardrum. Such liquid as lymph fluid is filled with the snail. Vibration of the liquid is converted into an electrical signal and the electrical signal is delivered to auditory nerve. In doing so, a brain of a human recognizes a sound. The bone conduction speaker can be arranged at various positions capable of smoothly providing an audio signal converted into vibration of frequency form to a user. In case of using the bone conduction speaker, vibration of a frequency form is delivered to the internal ear of a user by driving the bone conduction speaker in a manner that a bone conduction sound wave is conducted to a scull of a user. When the bone conduction speaker is used, a user is able to listen to an audio signal without jarring the eardrum. Meanwhile, the audio unit 160 can be used as an audio sensor as well.

The input unit 150 can receive an input of a user command from external. The input unit 150 can be implemented in various ways. For instance, the input unit 150 can be implemented by a keyboard, a keypad, a mouse, a touch pad, a button, a soft key or the like. In a broad sense, the input unit 150 can include a microphone, a touch screen and the like. The microphone can receive voice of a user and the touch screen can receive an input of a touch gesture of a user. In some cases, the microphone can be included in the audio unit and the touch screen can be included in the display unit.

The camera unit 110 captures an image of surrounding environment of the display device 100*a* and converts the image into an electrical signal. To this end, the camera unit 110 can include an image sensor capable of converting an optical signal into an electrical signal. The image captured by the camera unit 160 and converted into the electrical signal is stored in the storage unit 170. And then, the image can be outputted by the control unit 110. Or, the image can be outputted by the control unit 110 without being stored in the storage unit. And, the image captured by the camera unit 160 may correspond to a still image or a moving image. The camera unit 160 can be used as a motion sensor or a video sensor. The camera unit 160 may include a plurality of cameras if necessary.

The storage unit 170 can store such various digital data as a video, an audio, a picture, an application and the like. The application may correspond to a program used for an operation of the control unit 110. And, the video or the picture may correspond to data obtained by the camera unit 160. The storage unit 170 can be implemented by such a form as a RAM (random access memory), an SRAM (static random access memory), a ROM (read only memory), an EEPROM (electrically erasable programmable read only memory), a PROM (programmable read only memory) and the like. And, the storage unit 170 may perform a storing function in a manner of operating in relation to a web storage on the Internet. The storage unit 170 can further include an external storing medium capable of being attached and detached to/from the display device 100*a*. The external storing medium can be implemented by a slot form such as an SD (secure digital) memory or a CF (compact flash) memory, a memory stick form, a USB (universal serial bus) form or the like. In particular, the external storing medium can be attachable and detachable to/from the display device 100*a* and may be able to provide such content as an audio, a picture, a video, an application and the like to the display device 100*a*. For instance, the storage unit 170 can include a RAM, a ROM, a cache memory, a hard disk drive (HDD), a solid state drive (SSD), a CD, a DVD, a blue ray disk, a floppy disk (FDD), a magnetic disk, a memory card, a flash memory, a USB memory and the like.

The communication unit 180 performs communication with an external device using various protocols and may be then able to transceive data with the external device. The external device may correspond to a mobile terminal or a fixed terminal. For instance, the mobile terminal may correspond to a cellular phone, a smartphone, a tablet PC (personal computer), a smart pad, a notebook, a digital broadcast terminal, a PDA (personal digital assistant), a PMP (portable multimedia player), a digital camera, a navigation, or the like. The fixed terminal may correspond to a desktop, a DVD (digital video disc or digital versatile disc) player, a TV or the like.

Various protocols include a wired and a wireless communication protocols. In case of the wired protocol, the communication unit 180 can include various input output interfaces (not depicted) enabling wired data transmission communication to be performed with an external device. For instance, the interfaces include USB (universal serial bus), HDMI (high definition multimedia interface), DVI (digital visual interface), IEEE 1394, and an interface in consideration of data transmission according to a different similar specification associated with the data transmission. In case of the wireless communication, the communication unit 180 can include such an RF electronic circuit network in consideration of a radio access accessing an external communication network as the Internet, LAN (local area network), WAN (wide area network) and the like. A wireless communication network accessed by the communication unit 180 can support such a mobile communication scheme as GSM (global system for mobile communications), EDGE (enhanced data GSM environment), CDMA (code division multiple access), W-CDMA (wideband code division multiple access), TDMA (time division multiple access), Wibro, HSPA (high speed packet access), HSDPA (high speed downlink packet access), LTE (long term evolution) and the like and such a local area communication scheme as Bluetooth, RFID (radio frequency identification), IrDA (infrared data association), UWB (ultra wideband), ZigBee, WLAN (wireless LAN) (Wi-Fi) and the like.

In this case, the wired/wireless interface schemes correspond to embodiments to help understand the present specification. Since an interface scheme used for transmitting and receiving information can be easily changed by those skilled in the art, the interface scheme may be non-limited by the aforementioned embodiments in the present specification.

The power unit 190 is a power source connected with a battery or an external power source. The power unit can supply power to the display device 100a. The battery includes not only a primary battery but also a secondary battery. The secondary battery can include a rechargeable lithium ion battery, a lithium polymer battery, a nickel cadmium battery, a nickel hydride battery, a nickel zinc battery and the like.

Meanwhile, a display device 100a may indicate a device of various forms capable of processing digital data and performing an operation corresponding to the digital data. As performance of the display device 100a is enhancing, it is able to execute various contents via the display device 100a. For instance, the display device 100a can include a TV, a laptop computer, a desktop computer, a monitor, a smartphone, a tablet PC, a navigator, a PMP, a terminal for payment, a terminal for security, a kiosk and the like. In particular, a widely used portable device is recently utilized as a player of comprehensive multimedia contents.

So far, a block diagram for a display device 100a has been explained. In the following description, various embodiments are explained.

Figure 3:
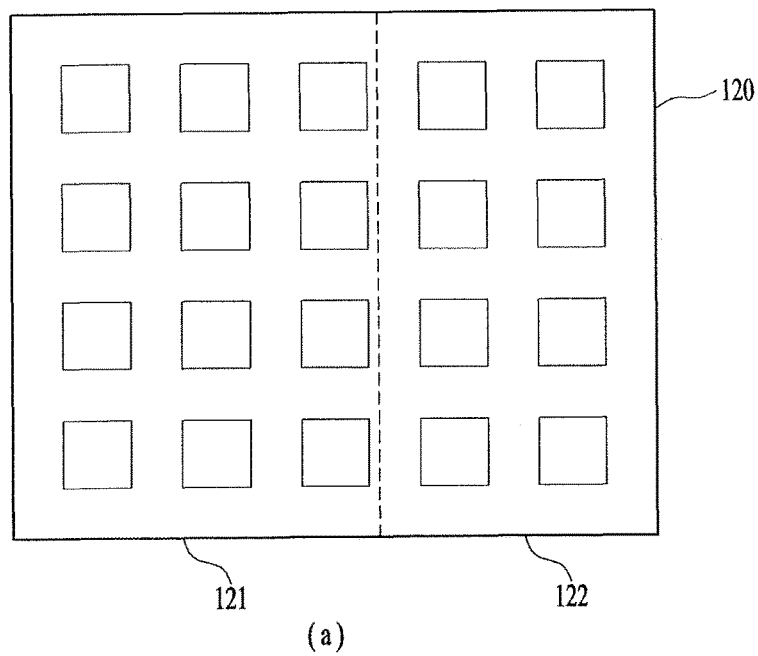
FIG. 3 is a diagram for one embodiment of arranging contents and a space when a flexible display is folded.
Figure 3:
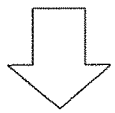
Figure 3:
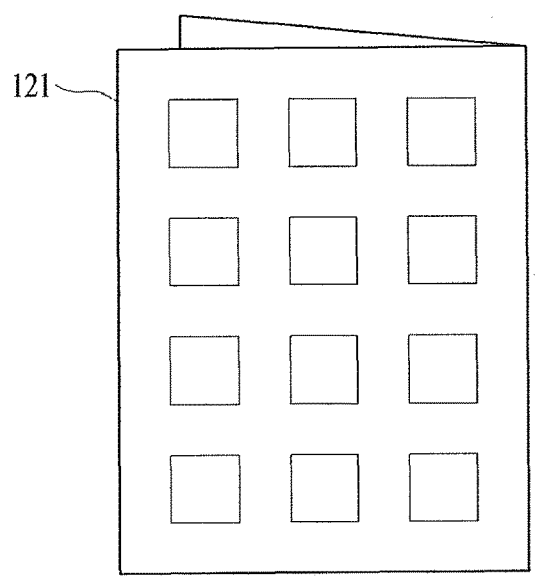

FIG. 3 is a diagram for one embodiment of arranging contents and a space when a flexible display is folded.

Referring to FIG. 3, it shows a flexible display unit 120 before the flexible display unit is folded. The flexible display unit 120 is flexible. And, the flexible display unit can be folded in a random area. The flexible display unit 120 can display at least one or more contents. Each of squares included in the flexible display unit 120 shown in FIG. 3 (*a*) may correspond to a single content. For instance, content may include a folder, an icon, a thumbnail and the like. An event may occur in a manner that the flexible display unit 120 is overlapped with each other. The overlapping event may correspond to a folding event. If the flexible display unit 120 is folded once, the flexible display unit 120 can be divided into a first area 121 and a second area 122.

Referring to FIG. 3 (*b*), it shows the folded flexible display unit 120. The flexible display unit may include two areas. The first area 121 can be arranged in a manner of heading to a direction at which a user is located. The second area 122 can be arranged in a manner of heading to a direction opposite to the direction to which the first area 121 is heading. In the present specification, the first area 121, which is arranged in a manner of heading to the direction at which the user is located, is called a using area.

The display device 100 can arrange contents in proportion to a size of a folded using area of the flexible display unit 120. Referring to FIG. 3 (*b*), the display device 100 can display 9 contents on the using area without changing a legacy size of the contents. The display device 100 can configure a symmetrical outer blank area. If the symmetrical outer blank area is not configured, asymmetrically arranged contents can be arranged in the using area. Asymmetrical content arrangement may cause inconvenience for a user. And, it may be uncomfortable for the user to input a touch command to a content positioned in the vicinity of an outer line of the using area. Hence, the display device 100 can configure a symmetrical outer blank area. The display device 100 configures a blank area and may be then able to symmetrically arrange contents.

Subsequently, the display device 100 can calculate an area of the folded using area and an area of the contents. The display device 100 can calculate the number of contents to be arranged at the using area based on the calculated area of the folded using area and the calculated area of the contents. The display device 100 can symmetrically arrange the configured blank area and the contents. In the present specification, symmetrical arrangement may indicate that a blank of the top of the using area, a blank of the bottom of the using area, a blank of the right end of the using area and a blank of the left end of the using area are identical to each other in size. Or, the symmetrical arrangement may indicate that the blank of the top of the using area and the blank of the bottom of the using area are identical to each other in size and the blank of the right end of the using area and the blank of the left end of the using area are identical to each other in size. All contents can be arranged with an identical space.

Figure 4:
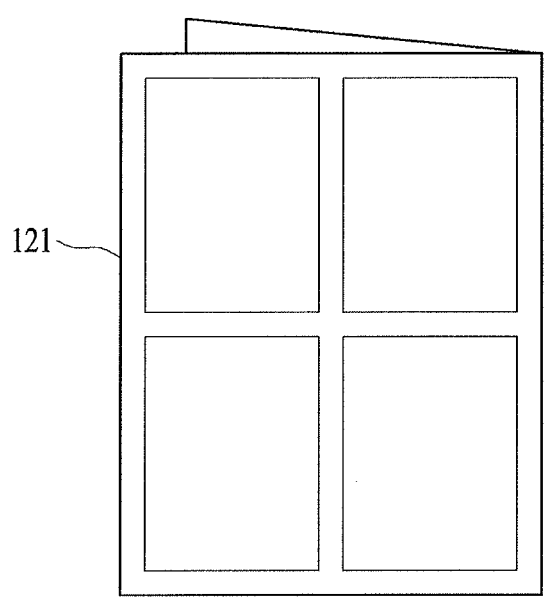
FIG. 4 is a diagram for a different embodiment of arranging contents and a space when a flexible display is folded.

FIG. 4 is a diagram for a different embodiment of arranging contents and a space when a flexible display is folded.

Referring to FIG. 4, it shows contents arranged at a using area 121. A display device 100 can arrange the contents in a manner of adjusting size of the contents. For instance, if an area of the using area is larger than areas of the contents to be arranged at the using area, the display device 100 can arrange the contents in a manner of enlarging the size of the contents. Or, if the area of the using area is smaller than the areas of the contents to be arranged at the using area, the display device 100 can arrange the contents in a manner of reducing the size of the contents. Or, if a user designates the number of contents to be arranged at an area with a specific value, the display device 100 can arrange the contents in a manner of adjusting size of the contents. When the contents are arranged by adjusting the size of the contents, the display device 100 can also symmetrically configure a space between an outer blank area and the contents.

And, the display device 100 can arrange the contents in a manner of adjusting the number of contents. For instance, if the area of the using area is larger than the areas of the contents to be arranged, the display device 100 can arrange the contents in a manner of increasing the number of the contents. Or, if the area of the using area is smaller than the areas of the contents to be arranged, the display device 100 can arrange the contents in a manner of reducing the number of the contents. Or, if a user designates size of contents to be arranged at an area with a specific value, the display device 100 can arrange the contents in a manner of adjusting the number of the contents. When the contents are arranged by adjusting the number of the contents, the display device 100 can also symmetrically configure a space between an outer blank area and the contents.

The display device 100 can arrange the contents in a manner of adjusting the size or the number of the contents. Or, the display device 100 can arrange the contents in a manner of adjusting both the size and the number of the contents.

Figure 5:
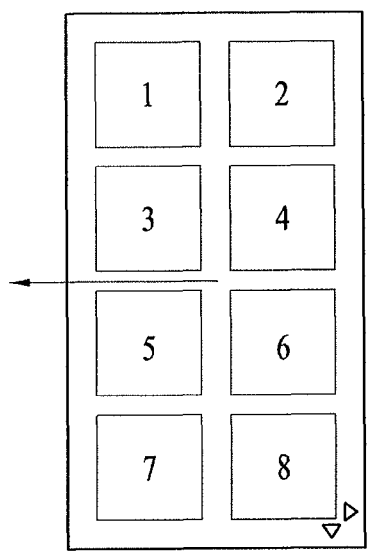
FIG. 5 is a diagram for one embodiment of flipping a screen when a flexible display is folded.
Figure 5:
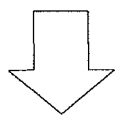
Figure 5:
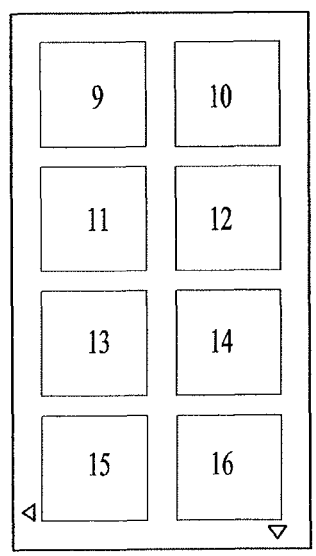

FIG. 5 is a diagram for one embodiment of flipping a screen when a flexible display is folded.

Referring to FIG. 5 (*a*), it shows a screen of a using area of a folded flexible display unit 120 at which an outer area and contents are symmetrically arranged. A display device 100 can include a plurality of contents. If the flexible display unit 120 is folded and a display area (e.g., using area) of a prescribed area is generated, the display device 100 symmetrically configures an outer blank area on the generated display area and may be then able to consistently arrange a space between the contents. The display area, which is generated by folding the flexible display unit, corresponds to one area of the flexible display area 120. Hence, contents capable of being displayed on the generated display area may correspond to a partial content. The display device 100 can indicate that there further exist additional contents. As shown in FIG. 5 (a), the display device 100 can indicate that there exist additional contents in the bottom and the left direction. The display device can receive a touch gesture flipping to the left.

Referring to FIG. 5 (b), it shows a flipped display device 100. The display device 100 can detect the number of contents arranged at a using area and an arrangement form. And, if a flipping command is inputted, the display device 100 can display a next page based on the number of the contents and the arrangement form arranged at the using area. As an embodiment, as shown in FIG. 5, the display device 100 can display initial 8 contents in two rows and four columns. If a flipping command is received, the display device 100 can display next 8 contents in two rows and four columns. The display device 100 displaying a flipped screen includes a previous content at the left of the displayed screen and can include additional content at the bottom of the displayed screen. Hence, the display device 100 can indicate that there exist contents at the left and the bottom of a displayed screen.

Figure 6:
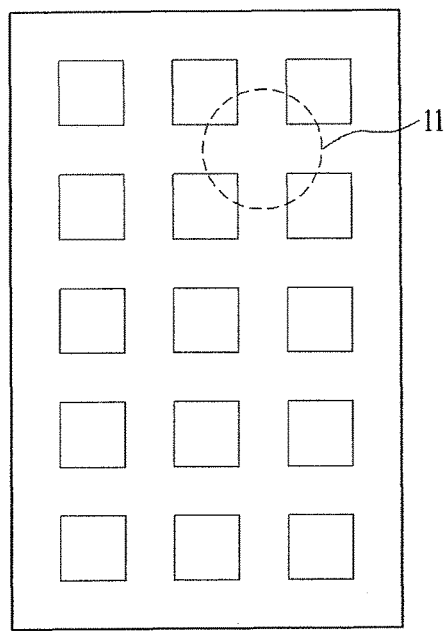
FIG. 6 is a diagram for one embodiment of displaying content based on a gaze of a user when a flexible display is folded.
Figure 6:
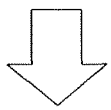
Figure 6:
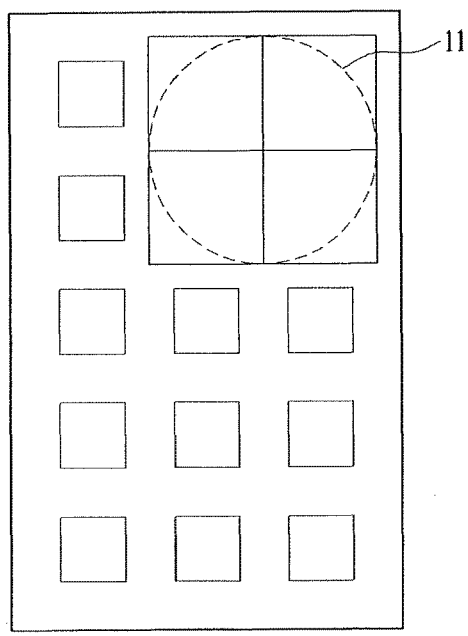

FIG. 6 is a diagram for one embodiment of displaying content based on a gaze of a user when a flexible display is folded.

A display device 100 can include a sensor capable of tracking a gaze of a user. The user tracking sensor detects an area at which the gaze of the user is located and can detect a direction of the user gaze. FIG. 6 (a) shows the area at which the user gaze is located among a using area. The display device 100 can detect a part of a flexible display unit 120 at which the gaze of the user is located.

Referring to FIG. 6 (b), the display device 100 can display content existing at an area 11 at which the detected gaze of the user is located in a manner of enlarging the content. The display device 100 can display the content existing at the area at which the gaze of the user is located in a manner of enlarging the content a little at least. Or, the display device 100 can display 4 contents in a manner of enlarging the contents on the basis of a point to which the user gaze is concentrated for more than a prescribed value.

Figure 7:
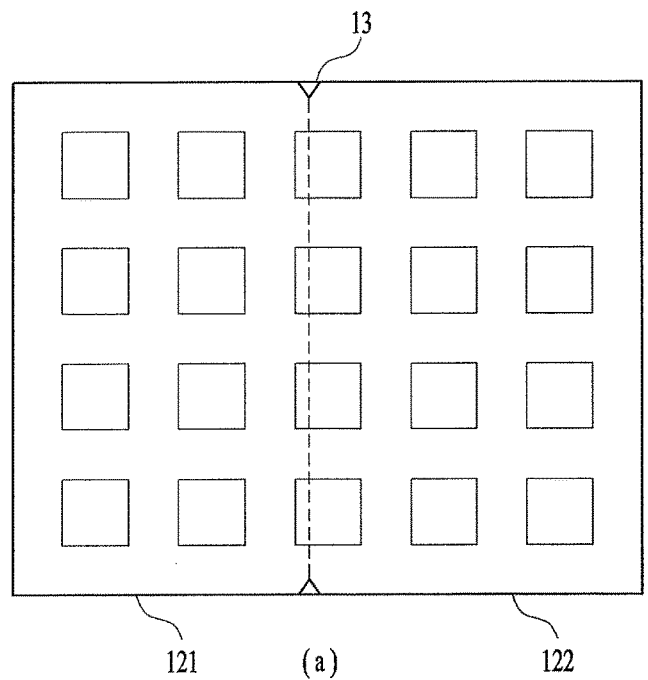
FIG. 7 is a diagram for one embodiment of displaying a using area when a flexible display is folded.
Figure 7:
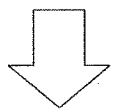
Figure 7:
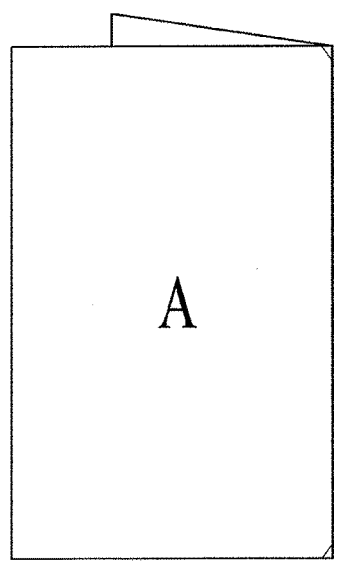

FIG. 7 is a diagram for one embodiment of displaying a using area when a flexible display is folded.

Referring to FIG. 7 (a), it shows a flexible display unit 120 before the flexible display unit is folded. The flexible display unit 120 can be folded in a random area. If the flexible display unit 120 is folded once, the flexible display unit 120 can be divided into a first area 121 and a second area 122. When the flexible display unit 120 is folded, a display device 100 can symmetrically display contents in consideration of an area of a folded display area, the number of contents, size of the contents and the like. Yet, if the display device 100 is folded in a specific area 13, the display device 100 can display a specific screen. The display device 100 can indicate the specific area 13 capable of displaying the specific screen.

Referring to FIG. 7 (b), it shows a folded flexible display unit 120. The flexible display unit 120 can include two areas. A first area 121, i.e., a using area, can be arranged in a manner of heading to a direction at which a user is located. A second area 122 can be arranged in a manner of heading to a direction opposite to the direction at which the first area 121 is heading. If the flexible display unit is folded in a specific area 13, the display device 100 can display a predetermined screen. In particular, if an area of a folded using area corresponds to a predetermined size, the display device 100 can display the predetermined screen on the using area. As an embodiment, the predetermined screen may correspond to such a screen as a home screen, a bookmark screen, a user configuration screen or the like.

Figure 8:
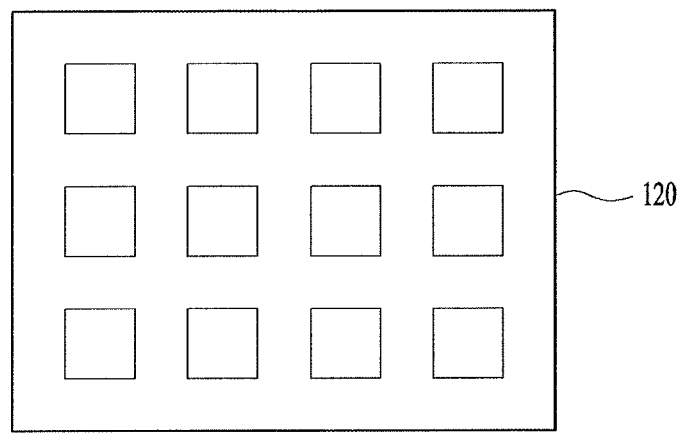
FIG. 8 is a diagram for one embodiment of arranging contents and a space when a flexible display is rolled.
Figure 8:
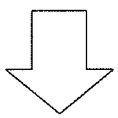
Figure 8:
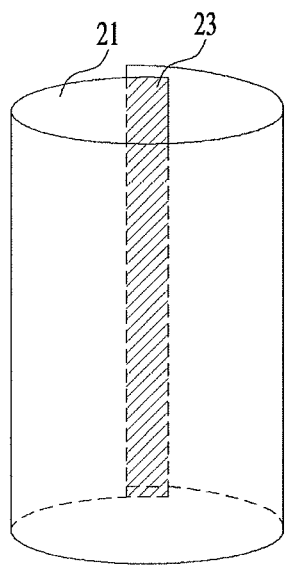

FIG. 8 is a diagram for one embodiment of arranging contents and a space when a flexible display is rolled.

Referring to FIG. 8 (a), it shows a flexible display unit 120 on which contents are displayed. The flexible display unit 120 can be used in a manner of being unfolded. The contents can be symmetrically arranged to a whole area of the flexible display unit 120. As mentioned in the foregoing description, the flexible display unit 120 may be flexible. Hence, the flexible display unit 120 is capable of being rolled.

Referring to FIG. 8 (b), it shows a rolled flexible display unit 120. If the flexible display unit 120 is rolled, the flexible display unit may become a shape of a circular column or a shape of a spiral column. A partial area 23 of the rolled flexible display unit 120 can be overlapped with a different area 21. The display device 100 can arranges contents based on an area except the area 23 blocked by the different area 21 among areas of the same flat of the flexible display unit 120.

The display device 100 can detect the area 23 blocked by the different area in a manner of being overlapped with each other using a sensor and the like. Although contents are displayed on the blocked area 23 of the flexible display unit 120, a user is unable to see the contents. Hence, the display device 100 can display contents on remaining area 21 except the blocked area 23 among the total area of the flexible display unit 120. The display device calculates an area of the remaining area 21 and may be then able to display contents in consideration of the number of the contents and size of the contents. The display device 100 symmetrically configures an outer blank area on the basis of the remaining area 21 and can arrange the contents with an identical space.

Figure 9:
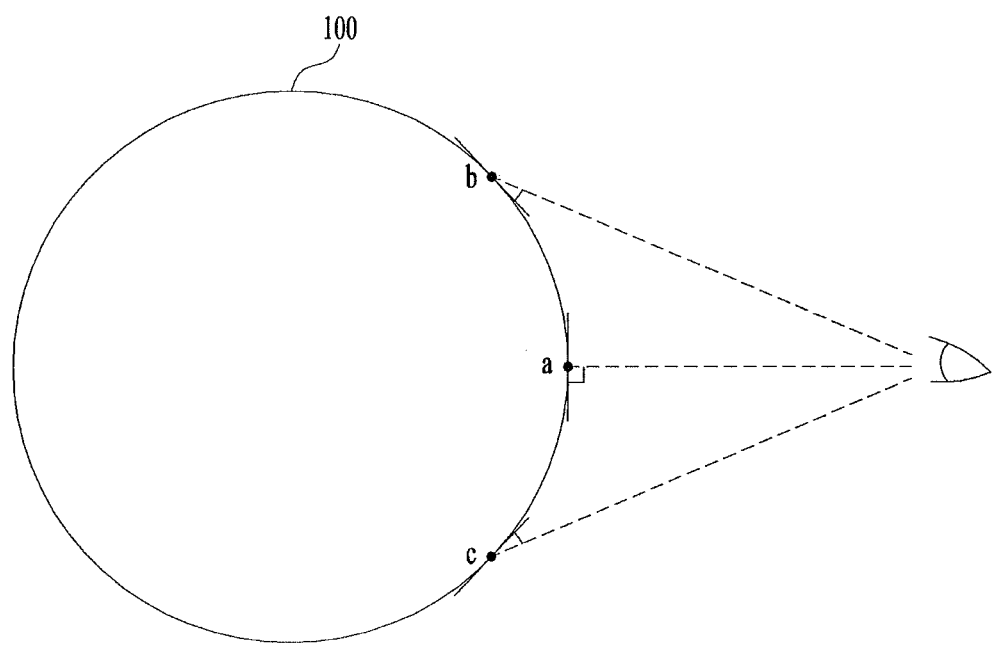
FIG. 9 is a diagram for one embodiment of displaying content based on a gaze of a user when a flexible display is rolled.

FIG. 9 is a diagram for one embodiment of displaying content based on a gaze of a user when a flexible display is rolled.

Referring to FIG. 9, it shows a rolled display device 100. When a user sees the rolled display device 100, the user is able to see a part of a display unit only. Hence, the display device 100 can arrange contents on the basis of an area at which a gaze of the user is located.

As mentioned in the foregoing description, the display device 100 can include a sensor unit capable of tracking a user gaze. As shown in FIG. 9, when a user sees a flexible display, 'a' point corresponds to a point at which the user gaze is vertically located. And, 'b' point and 'c' point correspond to points forming a prescribed angle with the user gaze. For instance, an angle formed by the 'b' or 'c' point and the user gaze may correspond to 30 degrees, 60 degrees or the like. An area of the flexible display unit where the user gaze is within a prescribed range may correspond to an area capable of being actually recognized by a user only. Hence, the area of the flexible display unit where the user gaze is within the prescribed range may become a using area.

The display device 100 can detect an angle formed by a gaze of a user and the display device. The display device 100 can calculate an area of the using area of the flexible display unit where the detected user gaze is within a predetermined angle range and an area of contents. The display device 100 can calculate the number of contents to be arranged at the using area based on the calculated area of the using area and the area of the contents.

Meanwhile, the display device 100 can indicate contents of an area at which a user gaze detected by the sensor unit is directly located in a manner of enlarging the contents.

Since detail process is identical to what is mentioned earlier in FIG. 6, explanation on the process is omitted at this time.

Figure 10:
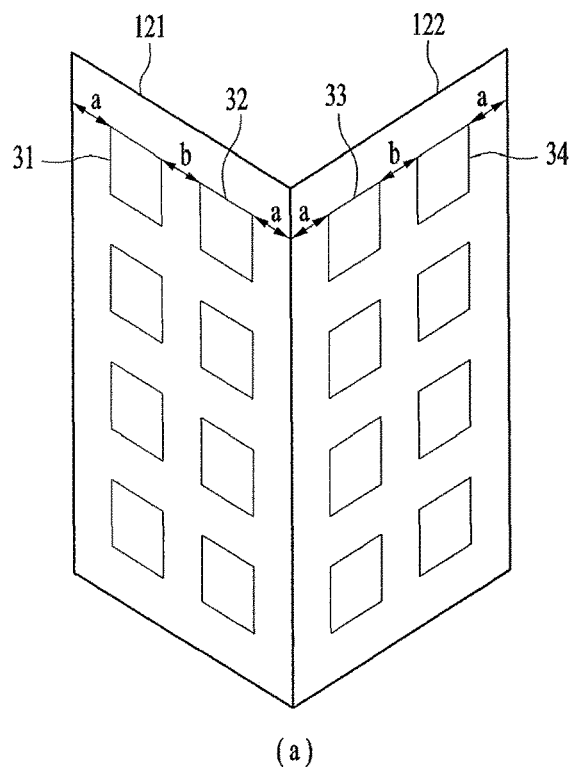
FIG. 10 is a diagram for one embodiment of arranging content and a space when a flexible display is unfolded.
Figure 10:
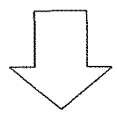
Figure 10:
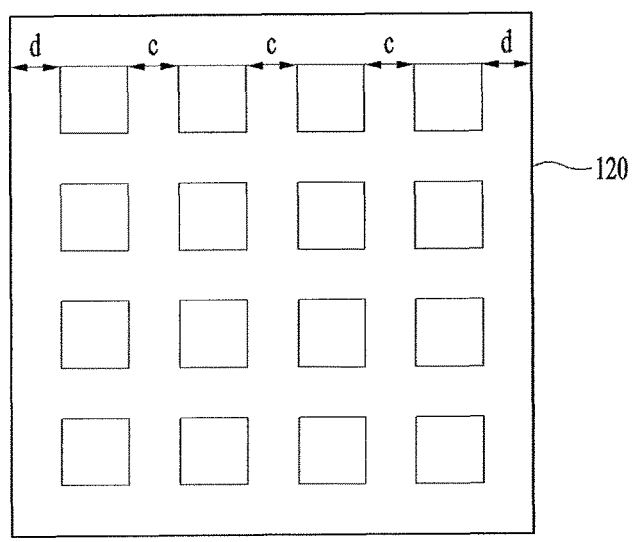

FIG. 10 is a diagram for one embodiment of arranging content and a space when a flexible display is unfolded.

Referring to FIG. 10 (a), it shows a folded flexible display unit 120. The folded flexible display unit 120 can be divided into a plurality of areas including a first area 121 and a second area 122. The display device 100 can arrange contents displayed on a using area together with a symmetrical blank area. Yet, the display device 100 can also display contents displayed on an area except the using area together with the symmetrical blank area. As shown in FIG. 10 (a), the folded display device 100 can set an outer blank area to 'a' and a space between contents to 'b', respectively, in response to the first area 121 and the second area 122. In particular, a space between a first content 31 and an outer line, a space between the first content 31 and a second content 32 and a space between the second content 32 and an outer line can be set to 'a', 'b' and 'a', respectively, in the first area 121. Similarly, a space between a third content 33 and an outer line, a space between the third content 33 and a fourth content 34 and a space between the fourth content 34 and an outer line can be set to 'a', 'b' and 'a', respectively, in the second area 122.

If the folded flexible display unit 120 is unfolded and arrangement of the currently arranged contents is not corrected, a space between contents displayed in the vicinity of a folded area of the flexible display unit 120 may correspond to '2a'. In particular, the space between the first content 31 and the outer line and the space between the fourth content 34 and the outer line identically correspond to 'a' and the space between the first content 31 and the second content 32 and the space between the third content 33 and the fourth content identically correspond to 'b' in the unfolded flexible display unit 120. Yet, a space between the second content 32 and the third content 33 may corresponds to '2a' in the unfolded flexible display unit 120. Hence, the display device 100 can adjust arrangement of the contents when the flexible display unit 120 is unfolded.

Referring to FIG. 10 (b), it shows an unfolded flexible display unit 120. The display device 100 can calculate an unfolded area of the flexible display unit 120 and an area of contents. The display device 100 can consistently arrange a space between the contents based on the calculated unfolded area of the flexible display unit 120 and the calculated area of the contents. In particular, the display device 100 can set both a space between a first content 31 and an outer line and a space between a fourth content and an outer line to 'd'. And, the display device 100 can set a space between contents to 'c'. In particular, the display device 100 can configure a symmetrical outer blank area of the flexible display unit 120 and may be able to identically configure a space between contents. And, the display device 100 can arrange contents in a manner of adjusting size of the contents.

In the foregoing description, various embodiments of a display device have been explained. In the following, a method of controlling the display device is explained.

Figure 11:
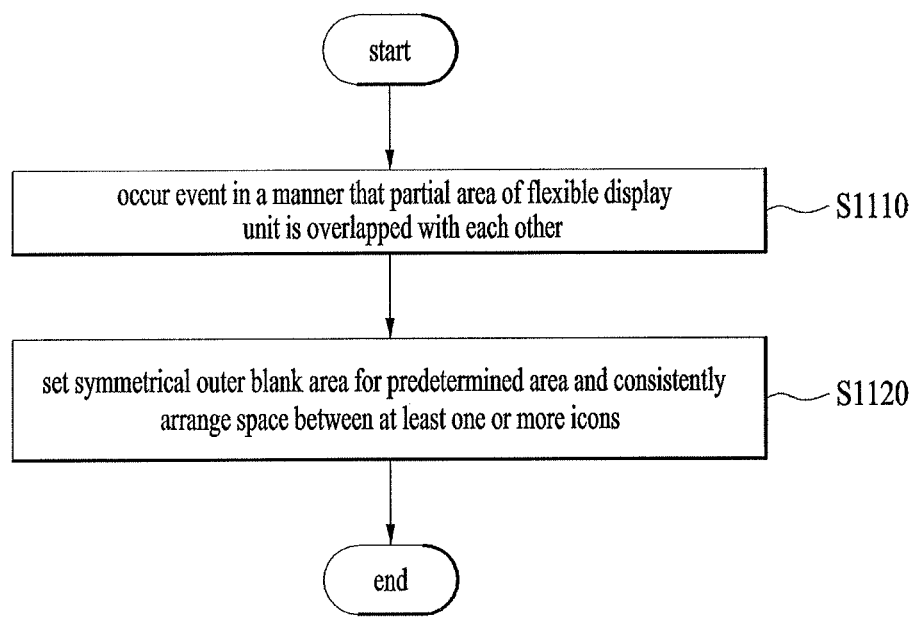
FIG. 11 is a flowchart for a method of controlling a display device according to one embodiment.

FIG. 11 is a flowchart for a method of controlling a display device according to one embodiment.

Referring to FIG. 11, an event may occur in a manner that a partial area of a flexible display unit is overlapped with each other in a display device including the flexible display unit [S1110]. For instance, the overlapped event may correspond to a folding event of which the flexible display unit is folded or a rolling event of which the flexible display unit is rolled.

Subsequently, the display device configures a symmetrical outer blank area for a predetermined area and can consistently arrange a space between at least one or more contents [S1120]. The display device can arrange contents in proportion to a size of a folded area of the flexible display unit. And, if an area of the folded area corresponds to a predetermined size, the display device can display a predetermined screen on the folded area. As an embodiment, the predetermined screen may correspond to such a screen as a home screen, a bookmark screen, a user configuration screen or the like. Or, the display device can arrange contents based on an area except an area blocked by a different area among areas of the same flat of the flexible display unit.

And, the flexible display of the display device can be unfolded. The display device calculates an unfolded area of the flexible display unit and an area of contents and may be able to consistently arrange a space between the contents based on the calculated area.

A display device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a display device according to the present specification can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A display device, comprising:
   a flexible display configured to display at least one or more icons; and
   a controller including a processor configured to:
   set a symmetrical outer blank area for a predetermined area when an event occurs in a manner that partial areas of the flexible display are overlapped with each other, wherein the overlapped event corresponds to a folding event;
   calculate an area of a folded area of the flexible display in response to the folding event and an area of the at least one or more icons;

determine a number of icons to be arranged to the folded area based on the calculated area of the folded area and the calculated area of the at least one or more icons;

consistently arrange a space between the at least one or more icons in the folded area after the symmetrical outer blank area is set;

symmetrically arrange the at least one or more icons in the folded area;

detect the number of icons arranged to the folded area and an arrangement form of the icons;

display an indicator indicating availability of a next page; and display the next page based on the number of icons and the arrangement form in response to receiving a touch-based flipping command.

2. The display device of claim 1, wherein the controller is configured to arrange the at least one or more icons in proportion to the size of a folded area of the flexible display.

3. The display device of claim 2, wherein the controller is configured to arrange the at least one or more icons in a manner of adjusting a size of the at least one or more icons.

4. The display device of claim 2, wherein the controller is configured to arrange the at least one or more icons in a manner of adjusting the number of the at least one or more icons.

5. The display device of claim 2, further comprising a sensor configured to track a gaze of a user, wherein the controller is configured to control the display unit to display at least one or more icons positioned at an area at which the gaze of the user detected by the sensor is located in a manner of enlarging the at least one or more icons.

6. The display device of claim 2, wherein when area of the folded area corresponds to a predetermined size, the controller is configured to control the display unit to display a predetermined screen on the folded area.

7. The display device of claim 6, wherein the predetermined screen corresponds to at least one of a home screen, a bookmark screen and a user configuration screen.

8. The display device of claim 1, wherein the overlapped event corresponds to a rolling event, and wherein the controller is configured to arrange the at least one or more icons based on an area except an area blocked by a different area among areas of the same flat of the flexible display.

9. The display device of claim 8, further comprising a sensor configured to track a gaze of a user, wherein the controller is configured to calculate area of an area of the flexible display where the gaze of the user detected by the sensor is within a predetermined angle range and area of the at least one or more icons and calculate the number of icons to be arranged to the area based on the calculated area of the area and the calculated area of the at least one or more icons.

10. The display device of claim 9, wherein the controller is configured to control the flexible display to display at least one or more icons positioned at an area at which the gaze of the user detected by the sensor is located in a manner of enlarging the at least one or more icons.

11. The display device of claim 1, wherein when the flexible display is unfolded, the controller is configured to calculate area of the unfolded flexible display and area of the at least one or more icons and consistently arrange a space between the at least one or more icons based on the calculated area of the unfolded flexible display and the calculated area of the at least one or more icons.

12. The display device of claim 11, wherein the controller is configured to arrange the at least one or more icons in a manner of adjusting a size of the at least one or more icons.

13. The display device of claim 11, wherein the controller is configured to set a symmetrical outer blank area of the flexible display.

14. A method of controlling a display device, which contains a flexible display displaying at least one or more icons, comprising:

setting, via a controller, a symmetrical outer blank area for a predetermined area when an event occurs in a manner that partial areas of the flexible display are overlapped with each other, wherein the overlapped event corresponds to a folding event wherein the controller includes a processor;

calculating an area of a folded area of the flexible display in response to the folding event and an area of the at least one or more icons;

determining a number of icons to be arranged to the folded area based on the calculated area of the folded area and the calculated area of the at least one or more icons;

consistently arranging, via the controller, a space between the at least one or more icons after the symmetrical outer blank area is set;

symmetrically arranging the at least one or more icons in the folded area;

detecting the number of icons arranged to the folded area and an arrangement form of the icons;

display an indicator indicating availability of a next page; and displaying the next page based on the number of icons and the arrangement form in response to receiving a touch-based flipping command.

15. The method of claim 14, wherein the consistently arranging a space between the at least one or more icons further comprises arranging the at least one or more icons in proportion to a size of the folded area of the flexible display.

16. The method of claim 15, wherein when the area of the folded area corresponds to a predetermined size, the consistently arranging the space between the at least one or more icons further comprises controlling the display unit to display a predetermined screen on the folded area.

17. The method of claim 14, further comprising:

unfolding the flexible display; and calculating an area of the unfolded flexible display and an area of the at least one or more icons and consistently arranging the space between the at least one or more icons based on the calculated area of the unfolded flexible display and the calculated area of the at least one or more icons.

* * * * *